United States Patent
Bode

[15] 3,669,474
[45] June 13, 1972

[54] COUPLED JOINT OF AXIALLY ALIGNED ELONGATED MEMBERS

[72] Inventor: Richard M. Bode, 7403 Fifth Avenue, Kenosha, Wis. 53140

[22] Filed: Aug. 26, 1970

[21] Appl. No.: 66,928

[52] U.S. Cl................................285/365, 285/365, 285/407, 285/408
[51] Int. Cl.............................................F16l 19/02
[58] Field of Search...................285/364, 365, 366, 367, 406, 285/407, 408, 409, 410, 411, 336

[56] References Cited

UNITED STATES PATENTS

| | | | |
|---|---|---|---|
| 3,059,947 | 10/1962 | Felburg et al. | 285/410 |
| 2,769,648 | 11/1956 | Herman | 285/366 X |
| 3,154,328 | 10/1964 | Masse | 285/365 X |
| 1,857,297 | 5/1932 | Faulkner | 285/367 |
| 2,548,216 | 4/1951 | Houghton et al. | 285/367 X |
| 2,801,116 | 7/1957 | Herman et al. | 285/365 |
| 3,398,978 | 8/1968 | Gasche | 285/367 X |

FOREIGN PATENTS OR APPLICATIONS

| | | | |
|---|---|---|---|
| 627,455 | 1/1963 | Belgium | 285/365 |
| 958,794 | 2/1957 | Germany | 285/365 |

Primary Examiner—David J. Williamowsky
Assistant Examiner—Wayne L. Shedd
Attorney—Marshall A. Burmeister, Francois N. Palmatier and John G. Hamby

[57] ABSTRACT

A coupled joint of axially aligned elongated members, which members may be tubular members or solid rods, or may have rectangular transverse cross sections which are solid or hollow, has opposed flanges on the adjacent ends of the elongated members and a plurality of clamping bands or jaw members holding said flanges together in aligned abutting relationship. The opposed flanges may be formed integrally at the adjacent ends of the elongated members or may constitute portions of ferrules secured to the ends of said members. Said opposed flanges have squared end surfaces in abutting relationship with each other, opposed outwardly diverging surfaces and aligned peripheral surfaces. The jaw members have web portions peripherally embracing the flanges and a plurality of opposed pairs of fingers which extend substantially axially under the web portions and exert a vise-like grip on the outwardly diverging surfaces of the flanges to maintain the flanges in aligned abutting relationship. Washers may be disposed between said outwardly diverging surfaces and the opposing ends of said fingers. A recess may be provided in each of said flanges to form a chamber of substantially trapezoidal axial section, and a gasket of similar axial section fills said chamber.

16 Claims, 13 Drawing Figures

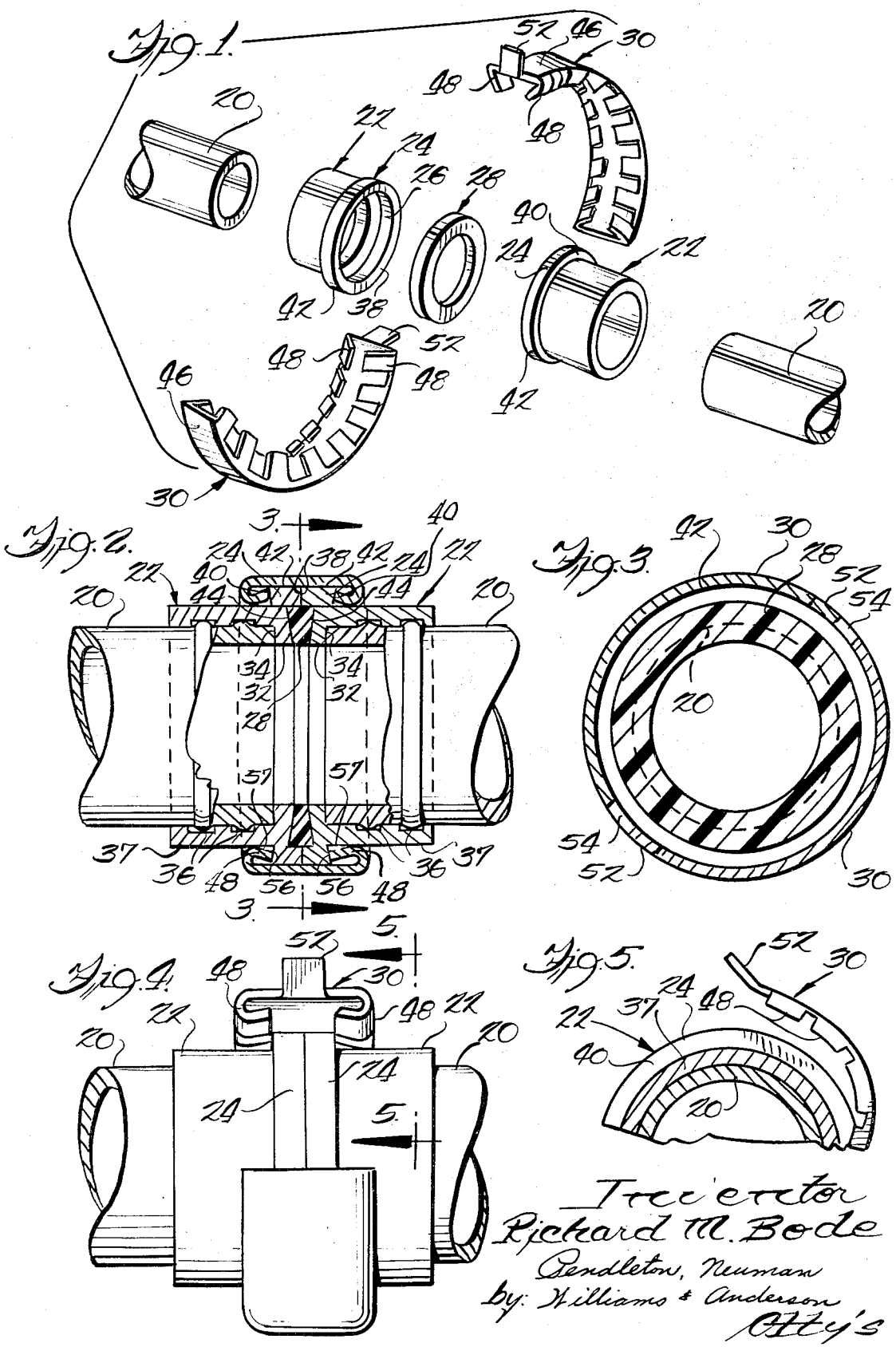

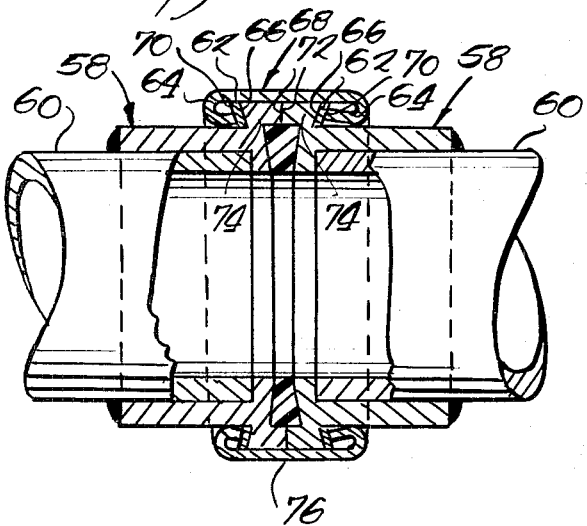
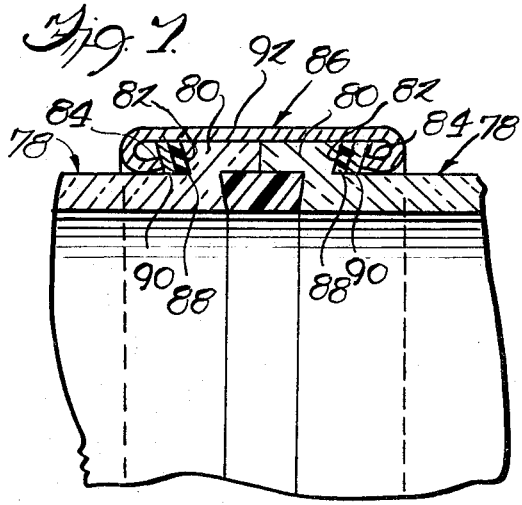
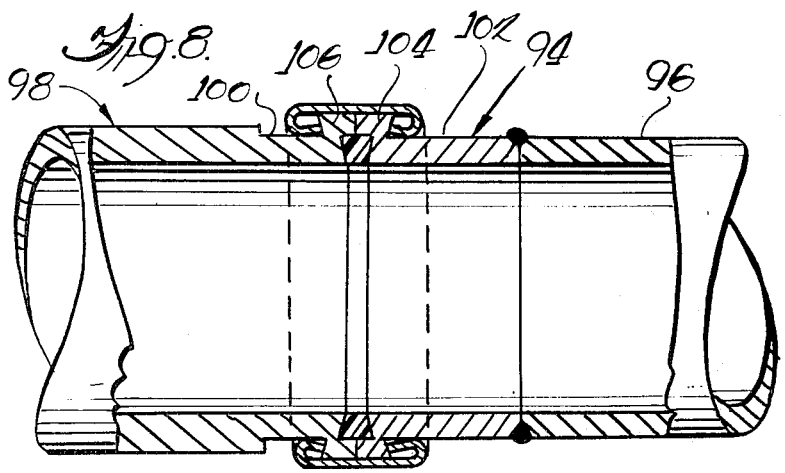
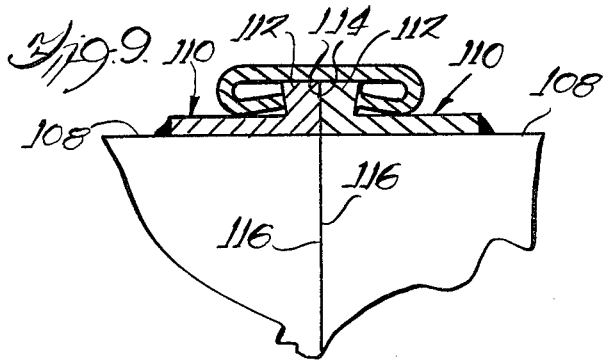

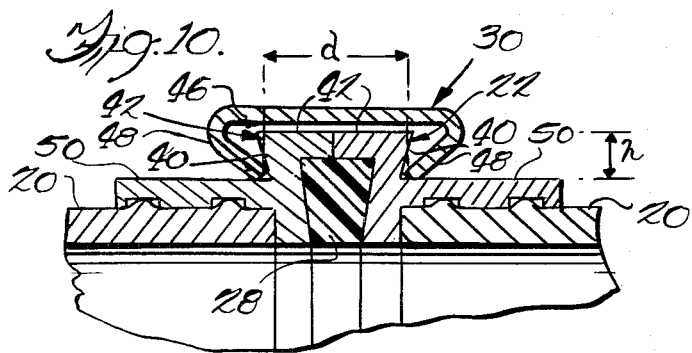
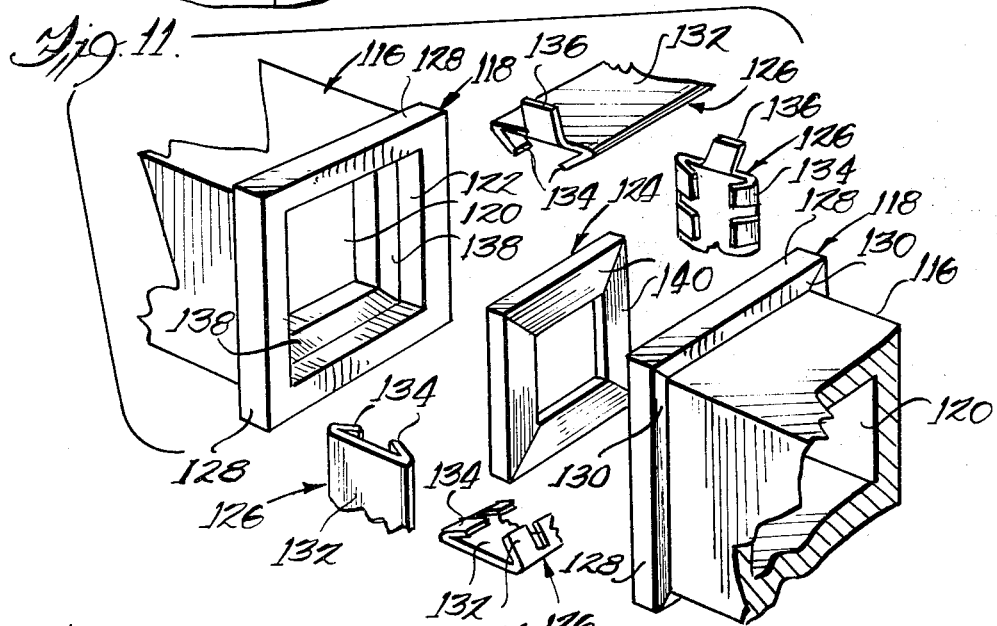
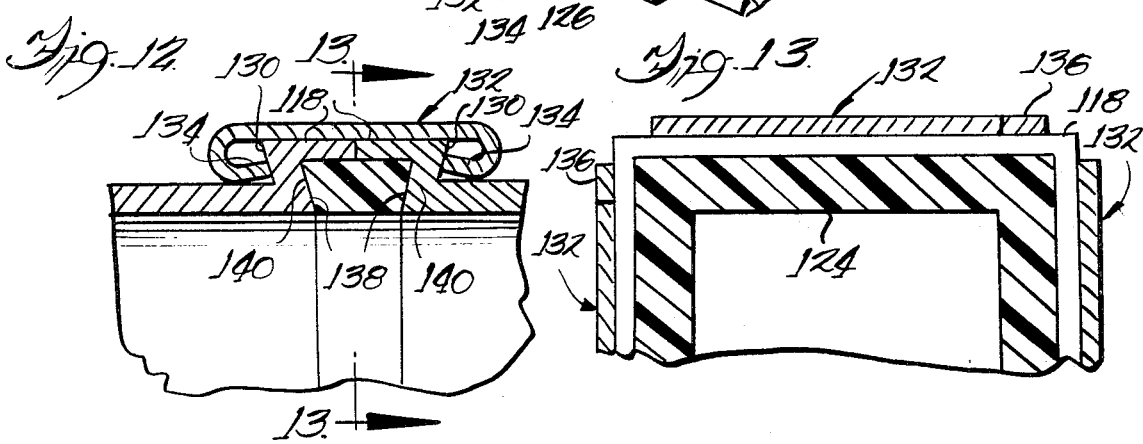

3,669,474

COUPLED JOINT OF AXIALLY ALIGNED ELONGATED MEMBERS

BACKGROUND OF THE INVENTION

This invention relates to a coupled joint or axially aligned elongated members, which may be tubular members or solid rods, or may have rectangular transverse cross sections which are solid or hollow, and, more particularly, to such a joint wherein opposed flanges are provided on the adjacent ends of said elongated members and clamping means are provided to close the joint and maintain said flanges in aligned abutting relationship.

Coupled joints of axially aligned elongated members are required in many fields, such as, for example, in the plumbing art in which pipes made of various materials and of different sizes and strengths are employed, in laboratories where various glass or plastic conduits are employed, in the building construction art wherein pipe scaffolding is erected, and in food processing plants in which food products are conveyed through elongated conduits.

In all fields where such coupled joints are required, it is desirable that such joints be originally made as efficiently as possible; and in installations in which it is sometimes necessary to disassemble and reassemble such joints, it is highly desirable that this also be accomplished as economically as possible, and that the joints be as accessible as possible. In food processing plants it is necessary that such joints be formed so as to avoid any collection of foreign matter around the joints and any contamination of the food products being conveyed through the joined conduits. And in certain other installations, such as government inspected distilleries, for example, it is also necessary that means be provided for readily detecting whether or not the coupled joint has remained intact or sealed since the last inspection.

Most such prior art coupled joints, such as those including threaded unions and the like in the plumbing field, are relatively expensive in that the joint components are necessarily larger and are not considered expendable should the joint be remade, and the use of such components results in a joint which occupies a relatively greater space and is relatively inaccessible when disassembly and reassembly thereof are necessary. Furthermore, the use of threaded unions in an extended pipe assembly is disadvantages in that the assembly cannot be economically entered at any point in the line to repair or replace a damaged pipe section.

Some prior art coupled joints of aligned elongated members have employed clamping bands which might be considered expendable. Such prior art joints are shown, for example, in U.S. Pat. Nos. 2,424,436, Crater; 2,548,216, Houghton et al.; 2,628,851, Jessup; and 3,099,060, Smith.

Those coupled joints, however, have not effectively solved the problem. They require that additional components to be used in conjunction therewith, and the manner of employing such additional components results in the joints being relatively more expensive to assemble, disassemble and reassemble; and the overall space occupied by the joint is relatively large. Furthermore, the non-uniformity of the periphery of such joints renders them more susceptible to contamination, and less suitable to the application of tapes therearound to prevent contamination.

It is an object of this invention therefore to provide a coupled joint of the nature indicated which is simple and economical in form, easy to assemble, disassemble and reassemble and suitably adaptable to many different circumstances and uses.

Other objectives and advantages of the invention will become apparent as the description proceeds.

SUMMARY OF THE INVENTION

In carrying out the invention in one form, there is provided a coupled joint of adjacent ends of a pair of axially aligned elongated substantially cylindrical members, comprising opposed flanges on said cylindrical members at said ends thereof, said opposed flanges having squared end surfaces in abutting relationship with each other, opposed outwardly diverging frusto-conical surfaces and aligned cylindrical surfaces, and a plurality of clamping bands or jaw members engaging said flanges, said jaw members including arcuate web portions circumferentially embracing said cylindrical surfaces of said flanges and a plurality of fingers arranged in axially opposed pairs, with the two fingers of each pair being bent toward each other under said web portion, the end portions of each said pair of fingers extending substantially axially and exerting a vise-like grip on said frusto-conical surfaces whereby said flanges are maintained in aligned abutting relationship.

Said axially aligned cylindrical members may be tubular members or solid rods, and the opposed flanges thereon may be integrally formed therewith or portions of ferrules secured to the adjacent ends thereof.

In the embodiment of the invention wherein tubular members are employed, an annular recess is provided in each of said flanges radially inwardly of said squared end surface thereof, said recesses being aligned and having radially inwardly converging side walls to form an annular chamber of substantially trapezoidal axial section, and an annular gasket having a similar axial section substantially fills said chamber.

In another embodiment of the invention, washers are disposed between each of said frusto-conical surfaces and the opposing end of said fingers, one of said washers being substantially yieldable in compression and abutting against the respective frusto-conical surface, and the other of said washers being relatively unyieldable in compression and disposed between said one of said washers and the opposing ends of said fingers.

In a still further embodiment of the invention the axially aligned elongated members have rectangular transverse cross sections, and may be either solid bars or hollow to provide rectangular passageways therethrough. Opposed rectangular flanges provided at the ends of the elongated members may be formed integrally therewith or separately attached thereto. Said opposed flanges have outwardly diverging trapezoidal surfaces and rectangular planar aligned peripheral surfaces. The web portions of the jaw members have rectangular planar surfaces. If the elongated members having aligned passageways therethrough, a rectangular recess is provided in each of the opposed flanges, said recesses being aligned and having inwardly converging side walls to form a rectangular chamber of substantially trapezoidal axial section, and a rectangular gasket having a similar axial section substantially fills said chamber. Washers may also be disposed between each of the outwardly diverging trapezoidal surfaces of the opposed flanges and the opposing ends of the fingers of the jaw members.

BRIEF DESCRIPTION OF THE DRAWINGS

FIG. 1 is an exploded view showing the component parts of one form of coupled joint embodying the invention;

FIG. 2 is an axial view, partially broken away and partially in section, of a completely assembled joint including the components illustrated in FIG. 1;

FIG. 3 is a sectional view taken in the direction of the arrows 3—3 of FIG. 2;

FIG. 4 is an axial view of the embodiment of the invention illustrated in FIG. 2, and shows one component partially removed when disassembling the joint;

FIG. 5 is a diametrical view taken in the direction of the arrows 5—5 of FIG. 4;

FIG. 6 is an axial view, partially broken away and partially in section, of an assembled joint according to another embodiment of the invention;

FIG. 7 is a partial axial sectional view illustrating still another embodiment of the invention;

FIG. 8 is an axial view, partially broken away and partially in section, illustrating further embodiments of the invention;

FIG. 9 is an axial view, partially in section, showing still another embodiment of the invention;

FIG. 10 is a partial axial section showing certain components of the invention at an intermediate stage in forming the embodiment of FIG. 2;

FIG. 11 is an exploded view showing the component parts of still another form of coupled joint embodying the invention;

FIG. 12 is an axial view, partially broken away and partially in section, of a completely assembled joint including the components illustrated in FIG. 11; and FIG. 13 is a sectional view taken in the direction of the arrows 13—13 of FIG. 12.

DESCRIPTION OF THE PREFERRED EMBODIMENTS

Referring to FIG. 1 of the drawings, the several components of a coupled joint according to one embodiment of the invention include an axially aligned opposed pair of pipe ends 20, an opposed pair of hard metal ferrules 22 having radially extending flanges 24 with annular recesses 26 therein, an annular gasket 28, and a pair of clamping bands or jaw members 30.

In the assembled joint as seen in FIG. 2, the opposed ferrules 22 have been rolled onto the respective pipe ends 20. The flanges 24 of the ferrules 22 each have a radially inwardly extending portion 32 including an annular surface or backup shoulder 34. Annular grooves 36 are provided in the axial portion 37 of each ferrule 22. By reason of the grooves 36 and backup shoulders 34, the ferrules 22 may be rolled onto the pipe ends 20 so as to avoid having to face the pipe ends. For uses in which any hairline voids between the rolled on pipe and the backup shoulder might be objectionable, these voids may be filled with dope of the type available under the trademark Teflon, for example.

As seen in FIGS. 1 and 2, the opposed flanges 24 have annular squared end or leading surfaces 38 in abutting relationship with each other, opposed outwardly diverging frusto-conical or trailing surfaces 40 and aligned cylindrical peripheral surfaces 42. A degree of taper of said frusto-conical surfaces as little as 10 to 15 percent has been found to produce satisfactory results.

The annular recesses 26 in the flanges 24 are aligned with each other and have radially inwardly converging side walls 44 to form an annular gasket-receiving chamber of substantially trapezoidal axial section (FIG. 2). The degree of taper of said sidewalls is preferably, but not necessarily, substantially the same as that of said frusto-conical surfaces 40.

As shown in FIG. 2, the annular gasket 28, of similar trapezoidal axial section, substantially fills said annular gasket-receiving chamber in the fully assembled joint. Gaskets available under such trademarks as Teflon, Hycar, Silicone, Viton, and brewery rubber have been found to be very satisfactory and lend themselves to low cost machining or die forming. The wedge-like gasket has also been found to be particularly well suited for use where the coupled pipe joint is employed for high-pressure or vacuum service. The gasket, which in the completed joint is somewhat compressed from its similar original shape, also aids in providing a flush metal-to-metal abutment and alignment of the end faces 38 of the flanges 42 and provides a pressure seal substantially free of cracks, crevices and pockets.

As seen best in FIG. 1, the jaw members 30 have arcuate web portions 46 and have been kerfed to provide a plurality of opposed pairs of fingers 48. Prior to completion of the joint, the opposed fingers of each pair are bent radially inwardly and toward each other at angles of approximately 45° from the web portion 46, and the tips of each pair of fingers are axially spaced apart a distance $d$ (see FIG. 10) which is only slightly less than the combined axial width of the aligned cylindrical surfaces 42 of the ferrules 22.

The jaw members are preferably made of stainless steel or other hard metal having a relatively high tensile strength. Their thickness is somewhat less than the radial height $h$ (FIG. 10) of the frusto-conical surface 40 of the ferrules 22. The jaw members also have sufficient resiliency to permit each pair of opposed fingers thereof to be manually snapped over the aligned cylindrical surfaces 42 to take the position shown in FIG. 10 as the assembly of the completed joint progresses. In this position, the tips of the fingers 48 will be in contact with the principal outer cylindrical surfaces 50 of the ferrules 22, and the web portion 46 of the jaw member will be spaced a slight radial distance from the cylindrical surfaces 42.

In a similar manner the other jaw member of said pair of jaw members 30 may be manually snapped over the aligned cylindrical surfaces 42. After both jaw members have been snapped onto the ferrules, one or both of the jaw members should preferably be rotated around the joint so that in the completed joint the jaw members will be substantially diametrically opposed.

As seen best in FIG. 3, each of the jaw members 30, including the outwardly bent end tabs 52 provided thereon, has an over-all arcuate length of slightly less than 180°, whereby a pair of jaw members will substantially surround the aligned cylindrical surfaces 42 of the ferrules with only relatively short peripheral spaces 54 between the end tabs 52 of one jaw member and the adjacent end of the other jaw member. While only two jaw members are shown, it will be understood that three or more jaw members of equal but shorter arcuate lengths may be similarly employed and symetrically positioned.

After all the jaw members have been manually snapped on and properly positioned on the ferrules 22, completion of the joint may be accomplished either manually or with the aid of spacial power-operated tools. In either method of completing the joint, a circumferential die-type tool (not shown) is employed to apply diametrically opposed radial forces to squeeze the web portions 46 of the jaw members 30 into circumferential engagement with the cylindrical surfaces 42 of the ferrules. This squeezing action simultaneously causes the opposed pairs of fingers 48 to be cammed axially toward each other by reason of their contact with the cylindrical surfaces 50 of the ferrules. The same squeezing action bends the end tabs 52 of the fingers into similar circumferential engagement with the surfaces 42.

When the squeezing action is completed, the jaw members are in the position and shaped as shown in FIG. 2. In this completed joint position, the fingers 48 of each opposed pair of fingers are substantially bent toward each other under the web portions 46 of the jaw members 30 and the end portions 56 of each pair of fingers extend substantially axially and exert a vise-like grip on the frusto-conical surfaces 40 of the flanges 42 of the ferrules and hold the flanges in aligned abutting relationship. In the completed joint, the end portions 56 of the fingers may actually ride slightly outwardly on the surfaces 40 to leave small annular spaces 57 between the fingers and the axial portions 37 of the ferrules. The frusto-conical surfaces 40 serve as locking shoulders for the opposed pairs of fingers 48 and thus prevent the jaw members from becoming disengaged in normal use of the coupled joint and render the joint highly resistant to shock, vibration and high static pressures in the joined pipe ends.

While a fully satisfactory coupled joint may be finally completed by utilizing a circumferential die-type tool and applying only manual force thereto, such joints may be more easily completed by using such a tool which is power operated and actuated, for example, by compressed air or an explosive charge. The use of such special power tools may be desirable if the tightest possible coupled joint is required. In one application, in which a coupled joint as hereinbefore described was used to connect adjacent ends of a ½ inch diameter steel pipe, it was found that the coupled joint remained properly aligned and sealed, and withstood a static pressure as high as 4,000 p.s.i.

Because the completed joint is circumferentially uniform, i.e., no components of the joint extend outwardly of the jaw members, the joint may be readily wrapped with tape (not shown), having a high temperature resistance if desired, to make the joint as sanitary as possible.

Although the coupled joint above described is highly resistant to breakage and misalignment in normal use, the joint may be readily disassembled when desired, such as, for example, when it may be necessary to replace a broken or leaking pipe, or to relocate pipe sections. In such instances, as shown in FIGS. 4 and 5, the coupled joint may be quickly disconnected by inserting a pry (not shown) such as a screwdriver, tangentially under the end tab 52 of each jaw member 30, and prying the jaw member out of engagement with the flanges 24. This prying action forces the ends of each opposed pair of fingers 48 further apart to permit them to clear the frusto-conical surfaces 40. After some of the opposed pairs of fingers 48 have cleared the surfaces 40, a pair of pliers may be employed to grip the end tab 52 and rip the jaw member 30 completely off of the flanges 24.

While the disassembling operation deforms the jaw members to such an extent that they cannot be again used, the jaw members are relatively inexpensive and considered expendable. The destruction of the expendable jaw members actually proves to be an advantage in certain uses in that the jaw members themselves can serve as "seals" in installations such as government inspected distilleries where it is necessary to determine whether or not a joint has been tampered with since the last inspection.

The remaining components of the coupled joint, however, are in no way damaged during disassembly of the joint and may be repeatedly reused to reassemble the joint with new interchangeable jaw members. It has been found, for example, that the joint components other than the jaw members can be reassembled over 100 times without limiting the effectiveness of the joint. It will be also readily noted that the coupled joint of this invention offers a further distinct advantages over joints employing threaded unions, in that when it is necessary to replace a damaged pipe section one need only open the line by removing the jaw members of two joints most proximate to the ends of the section to be replaced. With joints employing threaded unions, it is frequently necessary to disassemble and reassemble additional and undamaged sections in order to replace the damaged section. Furthermore, by avoiding the use of threaded unions, thin-walled tubing may be employed and the pipe sections to be joined are more easily lined up.

FIG. 6 illustrates an embodiment of the invention which is particularly suitable when employing ferrules formed of a soft metal, such as copper for example, or a plastic material. In this embodiment the opposed ferrules 58 may be fillet-welded as shown or otherwise fused to the adjacent pipe ends 60. Because of the relative softness of the ferrule material, it is preferable to insert a pair of annular washers 62 between the ends of the fingers 64 and the frusto-conical surfaces 66 of the ferrules. The washers prevent the ends of the fingers from gouging the frusto-conical surfaces 66 as the jaw members 68 are radially squeezed to form the completed joint, and further serve to more uniformly distribute the axial forces exerted by the fingers during the squeezing operation.

Although the washers 62 may not be frusto-conical in shape in their original form, they tend to assume such shape as a result of the aforesaid squeezing action. In any event, the washers provide a frusto-conical surface 70 against which the end portions of each opposed pair of fingers 64 exert a vise-like grip to maintain the squared end surfaces 72 of the flanges 74 in aligned abutting relationship, as previously described with respect to the embodiment of FIG. 2. In all other respects the coupled joints shown in FIGS. 2 and 6 are substantially identical, except that the axial widths of the web portions 76 of the jaw members 68 are sufficiently greater to accommodate the interposed washers.

FIG. 7 shows a coupled joint which differs from the embodiments previously described in that the axially aligned cylindrical members 78 are made of glass and the opposed glass flanges 80 are formed integrally with the cylindrical members. Because of the fragility of the glass material, two washers are preferably interposed between each of the frusto-conical surfaces 82 of the flanges 80 and the opposing ends of the fingers 84 of the jaw members 86. One opposed pair of washers 88, which may be made of rubber, is substantially yieldable in compression, and each washer of said pair abuts against the respective frusto-conical surface 82. The other opposed pair of washers 90, which may be made of steel or other hard metal, is relatively unyieldable in compression, and each washer of said pair is disposed between the respective washer 88 and the respective ends of the opposed fingers 84.

The coupled joint of FIG. 7 may be formed in the same manner as the previously described embodiments, except that a substantially lesser axial force should be applied to the jaw members 86 during the squeezing operation. Also, the width of the web portion 92 of each jaw member 86 must be great enough to accommodate the two interposed pairs of washers.

FIG. 8 shows still another form of coupled joint in which one side of the joint comprises a ferrule 94 butt-welded to the end of a pipe section 96 and the other side comprises a flanged tubular member 98 which is reduced in diameter near the flanged end thereof to provide a cylindrical surface 100 of the same diameter as that of the principal cylindrical surface 102 of the ferrule 94. This embodiment is particularly suitable for joining pipe sections having identical inside diameters but differing outside diameters. The member 98 may also represent one leg of an elbow, T-section, nipple or other well-known pipe fitting, which may have relatively thick walls. The ferrule 94 and the reduced-diameter portion 100 of the member 98 are provided with opposed radially outwardly extending flanges 104 and 106, respectively. In all other respects the coupled joint of FIG. 8 and the manner of forming the same are the same as described with respect to the coupled joint of FIG. 2.

FIG. 9 shows yet another form of coupled joint in which the axially aligned cylindrical members are solid rods 108. In this embodiment a pair of opposed ferrules 110 having radially extending portions 112 may be welded to the rods 108 at the ends thereof. The squared end surfaces 114 of the flange portions 112 are secured in abutting relationship in the completed joint in the same manner as previously described, except that no gasket-receiving chamber or gasket is necessary. Preferably, the squared end surfaces 114 are axially aligned with the abutting end surfaces 116 of the rods 108, but a alight axial misalignment may be tolerated, and the surfaces 116 are not necessarily faced to provide smooth abutting surfaces and may even be slightly spaced axially. In all other respects the coupled joint of this embodiment is identical to the embodiment of FIG. 2.

Referring to FIGS. 11-13 of the drawings, several components of a coupled joint according to a still further embodiment of the invention include an axially aligned opposed pair of elongated bars 116 having opposed rectangular flanges 118 at the ends thereof and axially aligned passageways 120 therethrough, aligned recesses 122 provided in said flanges, a rectangular gasket 124, and a plurality of clamping bands or jaw members 126.

It should be understood that in this embodiment the elongated bars 116 may be solid, as in the case of the embodiment illustrated in FIG. 9, in which event the recesses 122 and gasket 124 may be eliminated. Furthermore, while FIGS. 11-13 show the flanges 118 formed integrally with the bars 116, it should be understood that the flanges 118 may be portions of separate ferrule-like members which may be secured to the ends of the bars 116, such as by rolling them onto the bars or by welding, as in the case of the earlier described embodiments.

In the embodiment illustrated in FIGS. 11-13, the elongated bars 116 have rectangular or square transverse cross sections and the passageways 120 therethrough have rectangular or square transverse cross sections. The flanges 118 also have rectangular or square transverse cross sections, rectangular planar peripheral surfaces 128 and outwardly diverging trapezoidal surfaces 130.

The jaw members 126 differ from the jaw members of the earlier described embodiments only in that the web portions 132 thereof are rectangular and planar rather than arcuate, whereby when the joint of this embodiment is completed, the web portions 132 embrace the aligned peripheral surfaces 128 of the flanges 118. The jaw members 126 are also provided with opposed pairs of inwardly converging fingers 134 and end tabs 136 which serve the same purpose as the corresponding opposed fingers and end tabs of the earlier described embodiments.

In this embodiment, the aligned rectangular recesses 122 in the flanges 118 are provided with opposed pairs of inwardly converging trapezoidal side walls 138 to form a gasket-receiving chamber of substantially trapezoidal axial section. The rectangular gasket 124 is provided with opposed pairs of side walls 140 which are inwardly converging and trapezoidal in shape whereby the gasket has an axial section similar to that of the gasket-receiving chamber in which it is snugly received and retained in the completed joint.

In the completed joint, as shown in FIG. 12, as in the earlier described embodiments, the end portions of the fingers 134 of the jaw members 132 extend substantially axially and exert a vise-like grip on the outwardly diverging trapezoidal surfaces 130 of the flanges 118 whereby said flanges are maintained in aligned abutting relationship. The manner of assembling and disassembling the joint is similar to that of the earlier described embodiments, except that differently shaped die-tools will necessarily be employed to complete the joint after the jaw members are initially snapped onto the flanges 118.

While not shown in FIGS. 11–13, it should be understood that if the elongated bars 116 or the flanges thereof are formed of a frangible material such as glass, two washers, as in the case of the embodiment illustrated in FIG. 7, may be disposed between the trapezoidal surfaces 130 of the flanges 132 and the opposing ends of the fingers 134 of the jaw members 126, one of said washers being substantially yieldable in compression and abutting against the respective trapazoidal surfaces 130 and the other of said washers relatively unyieldable in compression and disposed between the first of said washers and the opposing ends of the fingers. Said washers, of course, should be generally rectangular in shape so as to conform to the rectangular shape of the flanges 118.

While particular embodiments of the invention have been shown, it will be understood, of course, that the invention is not limited thereto since many modifications may be made, and it is, therefore, contemplated to cover any such modifications as fall within the true spirit and scope of the invention.

The invention having thus been described, what is claimed and desired to be secured by Letters Patent is:

1. A coupler for connecting one end of a first elongated member to one end of a second elongated member comprising, in combination, a first means carried by the first of said elongated members defining a first flange extending outwardly from the axis of the first elongated member, said first flange having a leading surface confronting the one end of the second elongated member and a trailing surface on the side of the first flange opposite the leading surface, the trailing surface of the first flange being at an angle to the axis of elongation of the first member less than a right angle, means carried by the second of said elongated members defining a second flange extending outwardly from the axis of the second elongated member, said second flange having a leading surface abutting the leading surface of the first flange and a trailing surface, the trailing surface of the second flange being at an angle to the axis of elongation of the second member less than a right angle, a jaw member engaging the first and the second flanges, said jaw member having a web disposed adjacent to the first and second flanges with a central axis generally aligned with the abutting leading surfaces of the first and second flanges and a plurality of fingers extending from the web on opposite sides of the central axis thereof, the fingers on one side of the central axis of the web having a first bend extending under the web and said fingers extending generally normal to and abutting the trailing surface of the first flange, and the fingers on the opposite side of the central axis of the web having a second bend extending under the web and said fingers extending generally normal to and abutting the trailing surface of the second flange, whereby the fingers of the jaw member retain the jaw member on the flanges and maintain the leading surfaces of the first and second flanges in abutment.

2. The invention according to claim 1 in which said axially aligned elongated members are substantially cylindrical members, said outwardly diverging surfaces of said flanges are frusto-conical surfaces, and said web portions of said jaw members are arcuate web portions.

3. The invention according to claim 2 in which said substantially cylindrical members are tubular members.

4. The invention according to claim 2 in which said opposed flanges on said axially aligned substantially cylindrical members are portions of ferrules secured to the ends of said members.

5. The invention according to claim 3 in which an annular recess is provided in each of said flanges radially inwardly of said squared end surface thereof, said recesses being aligned to form an annular chamber, and an annular gasket substantially fills said chamber.

6. The invention according to claim 3 in which an annular recess is provided in each of said flanges radially inwardly of said squared end surface thereof, said recesses being aligned and having radially inwardly converging side walls, to form an annular chamber of substantially trapezoidal axial section, and an annular gasket having a similar axial section substantially fills said chamber.

7. The invention according to claim 5 in which said opposed flanges on said tubular members are portions of ferrules secured to the ends of said members.

8. The invention according to claim 2 in which two washers are disposed between each of said frusto-conical surfaces and the opposing ends of said fingers, one of said washers being substantially yieldable in compression and abutting against the respective frusto-conical surface, and the other of said washers being relatively unyieldable in compression and disposed between said one of said washers and the opposing ends of said fingers.

9. The invention according to claim 1 in which said axially aligned elongated members and said opposed flanges have rectangular transverse cross-sections, said outwardly diverging surfaces of said flanges are trapezoidal surfaces, and said web portions of said jaw members are substantially rectangular web portions.

10. The invention according to claim 9 in which said transverse cross-sections are substantially square and said elongated members have axially aligned passageways therethrough, said passageways having substantially square transverse cross-sections.

11. The invention according to claim 9 in which said opposed flanges on said axially aligned elongated members are portions of ferrules secured to the ends of said members.

12. The invention according to claim 10 in which a recess is provided in each of said flanges inwardly of said squared end surface thereof, said recesses having substantially square transverse cross-sections and being aligned to form a chamber having a substantially square transverse cross-section, and a gasket having a substantially square transverse cross-section substantially fills said chamber.

13. The invention according to claim 12 in which said aligned recesses have opposed pairs of inwardly converging trapezoidal side walls to form a gasket receiving chamber of substantially trapezoidal axial section, and a gasket having a similar axial section substantially fills said chamber.

14. The invention according to claim 12 in which said opposed flanges on said elongated members are portions of ferrules secured to the ends of said members.

15. The invention according to claim 11 in which two washers are disposed between each of said trailing surfaces and the opposing ends of said fingers, one of said washers being substantially yieldable in compression and abutting against the respective trailing surface, and the other of said washers being relatively unyieldable in compression and disposed between said one of said washers and the opposing ends of said fingers.

16. A coupler for connecting one end of a first cylindrical member to one end of a second cylindrical member comprising the combination of Claim 1 wherein the first means defining the first flange defines a surface parallel to the axis of elongation of the first member and the first flange extends outwardly from said surface, and the first bend of the fingers of the jaw member abuts said surface.

* * * * *